US008165271B2

(12) United States Patent
Djurovic et al.

(10) Patent No.: US 8,165,271 B2
(45) Date of Patent: Apr. 24, 2012

(54) CHATTERING LINE DETECTION SYSTEM AND METHOD

(75) Inventors: Dragan Djurovic, Surrey (CA); Charles G. Wier, Atlanta, GA (US)

(73) Assignee: Broadcom Corporation, Irvine, CA (US)

( * ) Notice: Subject to any disclaimer, the term of this patent is extended or adjusted under 35 U.S.C. 154(b) by 1063 days.

(21) Appl. No.: 12/057,050

(22) Filed: Mar. 27, 2008

(65) Prior Publication Data

US 2009/0034690 A1 Feb. 5, 2009

Related U.S. Application Data

(60) Provisional application No. 60/953,851, filed on Aug. 3, 2007.

(51) Int. Cl.
*H04M 1/24* (2006.01)
*H04M 3/08* (2006.01)
*H04M 3/22* (2006.01)

(52) U.S. Cl. .................. 379/1.04; 379/9.03; 379/14.01; 379/32.01; 379/32.04

(58) Field of Classification Search .......... 370/356–361, 370/401, 352; 379/219, 230, 9.03, 14.01, 379/1.01, 1.03, 1.04, 9, 9.04, 15.03, 22.02, 379/22.03, 23, 26.01, 27.01, 28, 29.01, 29.08, 379/29.11, 32.01, 32.04
See application file for complete search history.

(56) References Cited

U.S. PATENT DOCUMENTS

| 5,347,572 | A | * | 9/1994 | Avni | 379/93.17 |
| 5,553,116 | A | * | 9/1996 | Avni | 379/32.04 |
| 7,023,868 | B2 | * | 4/2006 | Rabenko et al. | 370/419 |
| 2004/0028206 | A1 | * | 2/2004 | Freyman et al. | 379/219 |
| 2006/0222169 | A1 | * | 10/2006 | Morris et al. | 379/355.01 |

* cited by examiner

*Primary Examiner* — Binh Tieu
(74) *Attorney, Agent, or Firm* — Fiala & Weaver P.L.L.C.

(57) ABSTRACT

A system and method is described that allows a system operator to remotely detect and diagnose a voice-enabled cable modem that has entered a chattering line state so that appropriate steps may be taken to avoid or rectify any of the problems that may result from this condition. Logic within the voice-enabled cable modem monitors for pulse dialing activity and/or excessive hook state and/or flash events that may be attributed to a faulty telephone and/or telephone line connected to the voice-enabled cable modem. Responsive to detecting such conditions, the logic within the voice-enabled cable modem reports a fault condition to an external management system via a cable data network.

22 Claims, 9 Drawing Sheets

CHATTERING LINE DETECTION SYSTEM AND METHOD

CROSS-REFERENCE TO RELATED APPLICATIONS

This application claims priority to Provisional U.S. Patent Application No. 60/953,851, entitled "Chatter Line Detection," filed Aug. 3, 2007, the entirety of which is incorporated by reference herein.

BACKGROUND OF THE INVENTION

1. Field of the Invention

The present invention relates to systems and methods for detecting, diagnosing and rectifying performance issues associated with the use of voice-enabled cable modems.

2. Background

Cable modems are currently available that can be used by cable operators to provide Voice-over-Internet-Protocol (VoIP) telephone service to customers. As a result, many people who have cable modems have opted to eliminate their Plain Old Telephone Service (POTS) in favor of VoIP telephone service delivered over cable.

Many cable operators offer VoIP telephone service based on Packet Cable™ specifications. PacketCable™ refers to an initiative led by Cable Television Laboratories, Inc. (CableLabs®) to develop interoperable interface specifications for delivering advanced, real-time multimedia services over cable. A PacketCable™-compliant system enables cable operators to offer both high-speed Internet and VoIP services through a single piece of customer premises equipment, known as an Embedded Multimedia Terminal Adapter (EMTA). An EMTA is essentially a cable modem and a VoIP adapter (referred to as a Multimedia Terminal Adapter) bundled into a single device. Services based on Packet Cable™ provide a significant advantage over third-party services in that voice packets are given guaranteed Quality of Service (QOS) across their entire path so that call quality can be assured.

A typical EMTA has one or two RJ-11 telephone ports for either a direct phone connection or to provide voice connectivity through wall jacks in a home or office. In some customer installations, a faulty telephone may be connected to the EMTA via these ports. Also, in some installations, the wiring used to connect a telephone to the EMTA via these ports may be faulty. In such installations, the faulty telephone and/or wiring may cause the EMTA to enter a "chattering line" state in which it reports spurious events to a Call Management System (CMS) via the cable data network. For example, the faulty telephone and/or wiring may cause the EMTA to report repetitive on/off hook and flash events. This will have the undesired effect of increasing Network-Based Called Signaling (NCS) traffic towards the CMS. Furthermore, when pulse dialing is enabled, the faulty telephone and/or wiring may cause the EMTA to erroneously report dialed digits to the CMS in a manner that results in the placement of a telephone call. This may result in a variety of serious problems, including the placement of false 911 calls and the charging of a customer for unused long distance services.

In view of the foregoing, it would be beneficial if a system and method were available that allowed a system operator to remotely detect and diagnose an EMTA that has entered a chattering line state so that appropriate steps may be taken to avoid or rectify any of the problems that may result from this condition.

BRIEF SUMMARY OF THE INVENTION

A system and method is described herein that allows a system operator to remotely detect and diagnose an EMTA that has entered a chattering line state so that appropriate steps may be taken to avoid or rectify any of the problems that may result from this condition.

In particular, a method for detecting a chattering line condition in a voice-enabled cable modem is described herein. The method includes monitoring for pulse dialing activity that may be attributed to a faulty telephone and/or telephone line connected to the voice-enabled cable modem. Responsive to detecting such pulse dialing activity, a fault condition is then reported to a management system that is external with respect to the voice-enabled cable modem.

In accordance with the foregoing method, monitoring for pulse dialing activity may include monitoring internally-rejected pulse dial events within the voice-enabled cable modem. Monitoring internally-rejected pulse dial events within the cable modem may include determining if a total number of internally-rejected pulse dial events exceeds a predefined threshold within a predefined monitoring interval. The method may further include setting the predefined threshold and the predefined monitoring interval by a system operator.

The foregoing method may further include running a receiver off-hook line-diagnostic test responsive to detecting the pulse dialing activity. Reporting the fault condition to the management system that is external with respect to the voice-enabled cable modem may include reporting results of this receiver off-hook line-diagnostic test.

A further method for detecting a chattering line condition in a voice-enabled cable modem is described herein. The further method includes monitoring for digit map mismatches and unexpected digit events that may be attributed to a faulty telephone and/or telephone line connected to the voice enabled cable modem. Responsive to detecting such digit map mismatches and unexpected digit events, a fault condition is then reported to a management system that is external with respect to the voice-enabled cable modem.

In accordance with this further method, monitoring for digit map mismatches and unexpected digit events may include determining if a total number of digit map mismatches and unexpected digit events exceeds a predefined threshold within a predefined monitoring interval. This method may also include setting the predefined threshold and the predefined monitoring interval by a system operator.

This further method may also include running a receiver off-hook line-diagnostic test responsive to detecting digit map mismatches and unexpected digit events. Reporting the fault condition to the management system that is external with respect to the voice-enabled cable modem may include reporting results of this receiver off-hook line-diagnostic test.

An additional method for detecting a chattering line condition in a voice-enabled cable modem is described herein. The additional method includes monitoring for excessive hook state and/or flash events that may be attributed to a faulty telephone and/or telephone line connected to the voice-enabled cable modem. Responsive to detecting such excessive hook state and/or flash events, a fault condition is reported to a management system that is external with respect to the voice-enabled cable modem.

In accordance with this additional method, monitoring for excessive hook state and/or flash events may include determining if a total number of valid loop closed/loop open events exceeds a predefined threshold within a predefined monitoring interval, wherein the valid loop closed/loop open events may include one or more of an off-hook event, on-hook event, pulse dial event, or flash event. This method may further include setting the predefined threshold and the predefined monitoring interval by a system operator.

This additional method may further include running a receiver off-hook line-diagnostic test responsive to detecting the excessive hook state and/or flash events. Reporting the fault condition to the management system that is external with respect to the voice-enabled cable modem may include reporting results of this receiver off-hook line-diagnostic test.

An embedded multimedia terminal adapter (EMTA) is also described herein. The EMTA includes a multimedia terminal adapter (MTA), a cable modem communicatively connected to the MTA, and a telephone line interface communicatively connected to the MTA. The cable modem is configured to provide a connection between the MTA and a cable data network. The telephone line interface is configured to provide a connection between a telephone line and the MTA. The MTA includes logic that is configured to monitor for pulse dialing activity that may be attributed to a faulty telephone and/or telephone line connected to the MTA via the telephone line interface and to report a fault condition to a management system via the cable data network responsive to detecting such pulse dialing activity.

The logic may be configured to monitor for such pulse dialing activity by monitoring internally-rejected pulse dial events and/or by monitoring digit map mismatches and unexpected digit events. The logic may be configured to monitor internally-rejected pulse dial events by determining if a total number of internally-rejected pulse dial events exceeds a predefined threshold within a predefined monitoring interval. The logic may be configured to monitor digit map mismatches and unexpected digit events by determining if a total number of digit map mismatches and unexpected digit events exceeds a predefined threshold within a predefined monitoring interval.

The logic may be further configured to run a receiver off-hook line-diagnostic test responsive to detecting such pulse dialing activity and to report results of the receiver off-hook line-diagnostic test to the management system via the cable data network.

A further EMTA is described herein. The EMTA includes an MTA, a cable modem communicatively connected to the MTA, and a telephone line interface communicatively connected to the MTA. The cable modem is configured to provide a connection between the MTA and a cable data network. The telephone line interface is configured to provide a connection between a telephone line and the MTA. The MTA includes logic that is configured to monitor for excessive hook state and/or flash events that may be attributed to a faulty telephone and/or telephone line connected to the MTA via the telephone line interface and to report a fault condition to a management system via the cable data network responsive to detecting such excessive hook state and/or flash events.

The logic may be configured to monitor for such excessive hook state and/or flash events by determining if a total number of valid loop closed/loop open events exceeds a predefined threshold within a predefined monitoring interval, wherein the valid loop closed/loop open events may include one or more of an off-hook event, on-hook event, pulse dial event, or flash event.

The logic may be further configured to run a receiver off-hook line-diagnostic test responsive to detecting such excessive hook state and/or flash events and to report results of the receiver off-hook line-diagnostic test to the management system via the cable data network.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
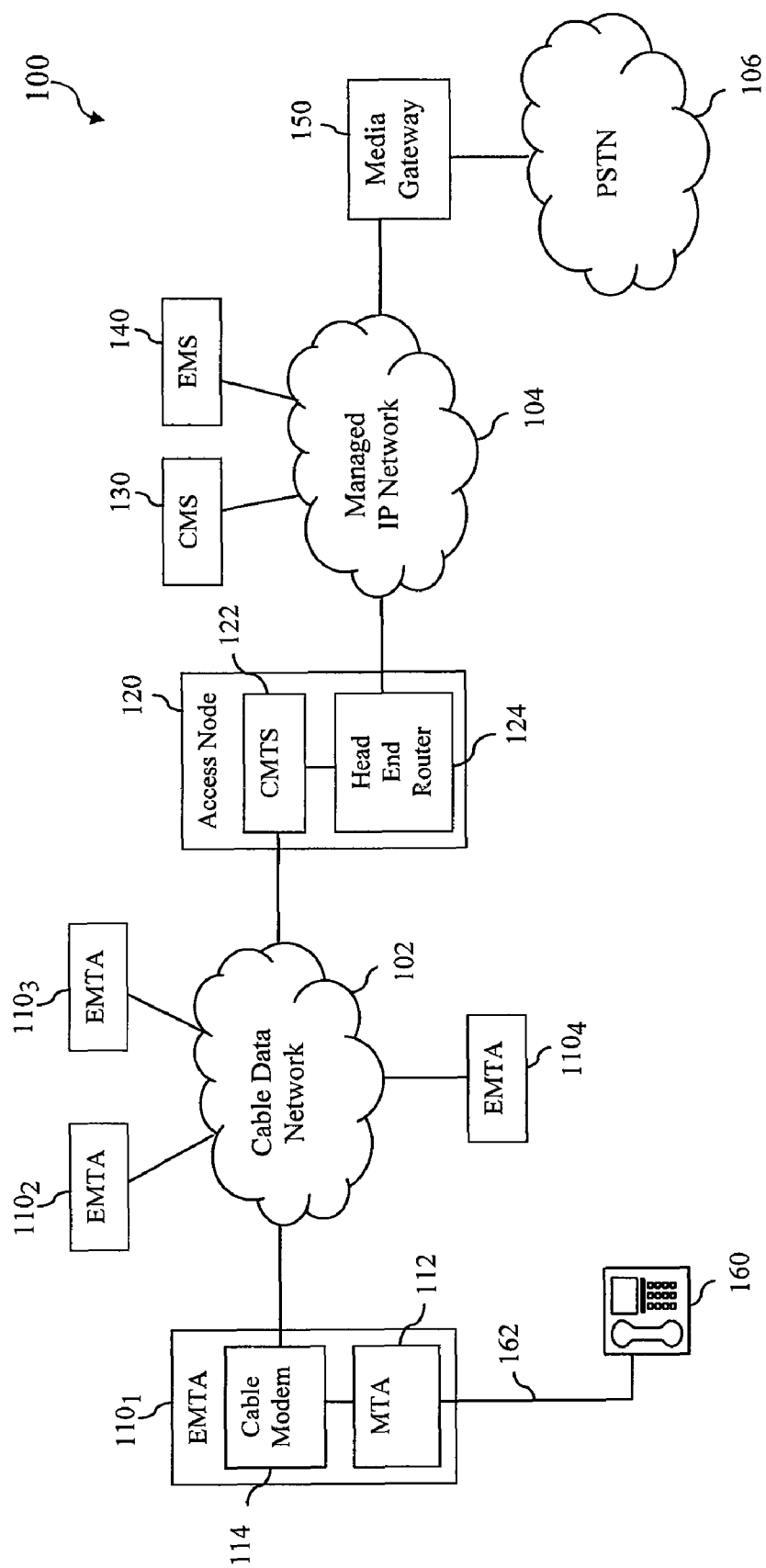
FIG. 1 is a block diagram of a communications system in which an embodiment of the present invention may be implemented.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to affect such feature, structure, or characteristic in connection with other embodiments whether or not explicitly described 1. Example Operating Environment FIG. 1 is a block diagram of an example communications system 100 in which an embodiment of the present invention may be implemented. Communications system 100 provides a network architecture by which high-speed Internet and VoIP services may be delivered to customers associated with embedded multimedia terminal adapters (EMTAs) $110_1$-$110_4$. These services are delivered in a manner that complies with specifications published by PacketCable™. At a high level, communications system 100 includes three networks—namely, a cable data network 102, a managed Internet Protocol (IP) network 104, and the Public Switched Telephone Network (PSTN) 106.

Generally speaking, cable data network 102 provides transport between customer premises and a cable head end. Cable data network 102 complies with the DOCSIS (Data Over Cable Service Interface Specifications) standard, developed and published by Cable Television Laboratories, Inc. (CableLabs®). Cable data network 102 is typically an all-coaxial or a hybrid fiber/coaxial (HFC) cable network. Access to cable data network 102 is provided by a Multi-Service Operator (MSO). The MSO also provides an access node 120 that connects cable data network 102 to managed IP network 104.

Each EMTA $110_1$-$110_4$ resides at a customer site and operates as an interface between customer premises equipment and cable data network 102. Such customer premises equipment may include a telephone, computer, facsimile machine, or other device capable of sending or receiving data over a packet network. As shown in FIG. 1, representative EMTA $110_1$ includes a multimedia terminal adapter (MTA) 112 and a cable modem 114. In alternate installations, instead of an EMTA, a customer premises may include a stand-alone MTA (SMTA) that is connected to an external cable modem via a USB or Ethernet cable.

MTA 112 is coupled to cable data network 102 via cable modem 114. Cable modem 114 provides an access interface to cable data network 102 via a radio frequency (RF) connector and a tuner/amplifier (not shown in FIG. 1). Generally speaking, MTA 112 performs processing functions necessary for delivering and receiving packetized voice-band data over cable network 102, including but not limited to echo cancellation, packet loss concealment, call progress tone generation, DTMF/pulse and fax tone detection, audio compression and decompression, packet de-jittering, and IP packetization and depacketization. As shown in FIG. 1, a telephone 160 is connected to MTA 112 via an EMTA port, such as an RJ-11 port, to allow a customer to make or receive VoIP telephone calls.

Cable modem 114 is communicatively connected to access node 120 via cable data network 102. Access node 120 provides services to a plurality of downstream customers (including but not limited to the customers respectively associated with EMTAs $110_1$-$110_4$) and comprises cable modem termination system (CMTS) 122 and head end router 124. CMTS 122 may be communicatively connected to head end router 124 via an Ethernet 100 BaseX connection. CMTS 122 terminates the cable data RF link with cable modem 114 and implements data link protocols in support of the service that is provided. Given the broadcast characteristics of the RF link, multiple customers may be serviced from the same CMTS interface.

Thus, cable modem 114 and CMTS 122 operate as forwarding agents and also as end-systems (hosts). Their principal function is to transmit IP packets transparently between the head end and the customer premises. The above-noted DOCSIS and PacketCable™ specifications provide a series of protocols to implement this functionality.

Head end router 124 is responsible for transferring packets between CMTS 122 and managed IP network 104 to enable the provision of high-speed Internet and VoIP services to the customers associated with EMTAs $110_1$-$110_4$. Managed IP network 104 represents the core IP network that links cable data network 102 to PTSN 106. In regard to VoIP services, managed IP network 104 is responsible for interconnecting components required for signaling, media and quality of service establishment. Managed IP network 104 also provides connectivity to other managed IP networks and cable data networks (not shown in FIG. 1).

As shown in FIG. 1, a Call Management Server (CMS) 130 is communicatively connected to managed IP network 104. Generally speaking, CMS 130 is the hardware or software component in a VoIP communication system that provides the telephony intelligence and that is responsible for telephone call processing. In communications system 100, CMS 130 is responsible for creating the connections and maintaining endpoint states required to allow the customers associated with EMTAs $110_1$-$110_4$ to place and receive telephone calls and to use features such as call waiting, call forwarding and the like. For example, CMS 130 performs operations that enable calls to be placed between telephones attached to EMTAs $110_1$-$110_4$ and telephones residing on PSTN 106. Such calls are routed through a media gateway 150. CMS 130 can also enable calls to be placed between telephones attached to EMTAs $110_1$-$110_4$ and other EMTAs residing on cable data network 102 or other cable data networks (not shown in FIG. 1).

In communications system 100, functions relating to network management, maintenance, and monitoring are performed by an Element Management System (EMS) 140, which is connected to managed IP network 104. To perform such functions, EMS 140 employs the Simple Network Management Protocol ("SNMP"). As will be appreciated by persons skilled in the relevant art(s), SNMP is a standard protocol used by network management systems to monitor network-attached devices for conditions that warrant administrative attention. SNMP is part of the IP suite as defined by the Internet Engineering Task Force (IETF). There are currently three versions of SNMP-version 1 ("SNMPv1") as defined by Requests for Comments (RFCs) 1155-157, version 2 ("SNMPv2") as defined by RFCs 1441-1452, and version 3 ("SNMPv3") as defined by RFCs 3411-3418. Each of these documents is incorporated by reference as if fully set forth herein.

EMS 140 uses SNMP to obtain status information about the EMTAs that are connected to cable data network 102 and to configure settings and functions within each EMTA. In particular, EMS 140 uses SNMP Management Information Bases (MIBs) to perform these functions. As will be readily understood by persons skilled in the relevant art, MIBs are SNMP-related data structures that carry the management data of a managed device or system. MIBs may be thought of as virtual databases that include configuration, status and statistical information about a network element or device such as an EMTA, MTA or cable modem. EMS 140 obtains the values of MIB data elements from a device by communication via the SNMP protocol.

The various data elements that make up a MIB may include status information about a system or device, any interfaces in the device, neighboring device identifiers (IDs), or the like. A large number of standard MIBs are currently defined for all types of network entities including but not limited to switches, routers, bridges, multiplexers or the like. The PacketCable™ standard defines MIBs for EMTA device provisioning.

2. Chattering Line Issues

In further reference to communications system 100 of FIG. 1, MTA 112 (within EMTA 110$_1$) is configured to monitor conditions on line 162 that connects telephone 160 to EMTA 110$_1$ and, based on the monitored conditions, to detect if certain signaling events have occurred that should be reported to CMS 130. For example, MTA 112 is configured to monitor the conditions on line 162 to detect if an off-hook event, on-hook event, flash event, or pulse dial event has occurred.

To detect these signaling events, MTA 112 monitors line 162 to determine whether the voltage on line 162 is high or low. If the voltage is high, then line 162 is in a "loop open" condition. If the voltage is low, then line 162 is in a "loop closed" condition. MTA 112 determines whether a signaling event has occurred by monitoring how long line 162 is in a loop open and/or loop closed condition. Standard requirements for detecting and reporting such signaling events are set forth in specification entitled "GR-506-CORE, Signaling for Analog Interfaces" published by Telcordia Technologies, Inc. ("the Telcordia GR-506-CORE specification"), which is also referenced by certain PacketCable™ specifications. This specification is incorporated by reference as if fully set forth herein.

Figure 2:
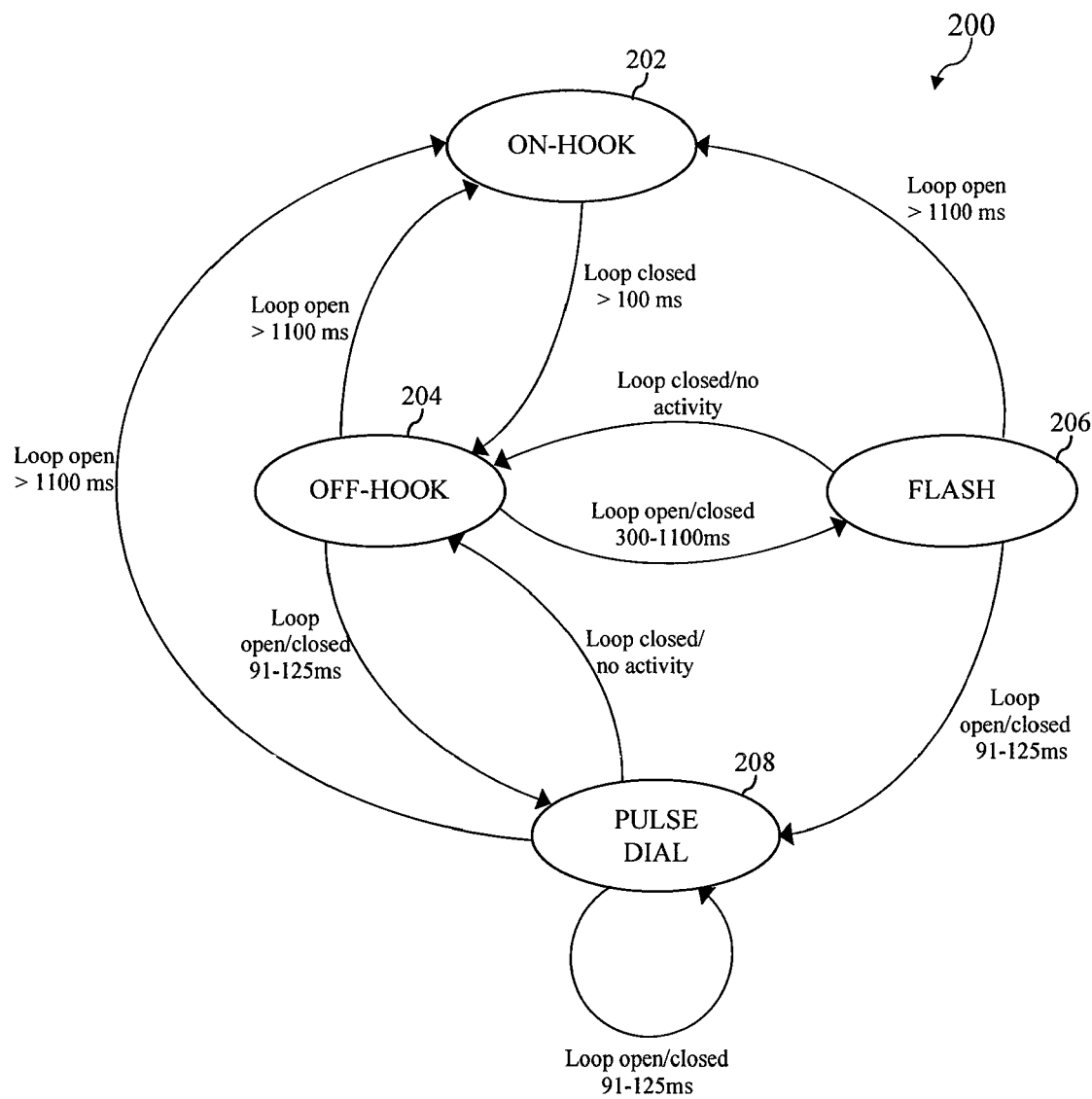
FIG. 2 is a state flow diagram that illustrates the signaling behavior of a Media Terminal Adapter (MTA) in response to the monitored state of a telephone line connected thereto.

FIG. 2 is a state flow diagram 200 that illustrates the signaling behavior of MTA 112 in response to the monitored conditions on line 162. In particular, state flow diagram 200 illustrates how the duration of loop open and/or loop closed conditions on line 162 will cause MTA 112 to transition between different detected signaling events. The signaling events that are detected by MTA 112 are represented as state bubbles, and include an on-hook event 202, an off-hook event 204, a flash event 206, and a pulse dial event 208. The conditions on line 162 that lead to the detection of such signaling events are represented as arrows connecting the state bubbles. The signaling behavior depicted in state flow diagram 200 is intended to comply with standard signaling event detection requirements such as those set forth in Telcordia GR-506-CORE specification as mentioned above.

In a situation in which telephone 160 and/or line 162 is faulty, conditions on line 162 may cause MTA 112 to detect false signaling events and to report such spurious events to CMS 130. When this occurs, EMTA 110$_1$ can be said to have entered a "chattering line" state. Examples of the types of false signaling events that may be detected and reported by MTA 112 while EMTA 110$_1$ is in a chattering line state and the conditions giving rise to these events will now be described in further reference to state flow diagram of FIG. 200.

Figure 3:
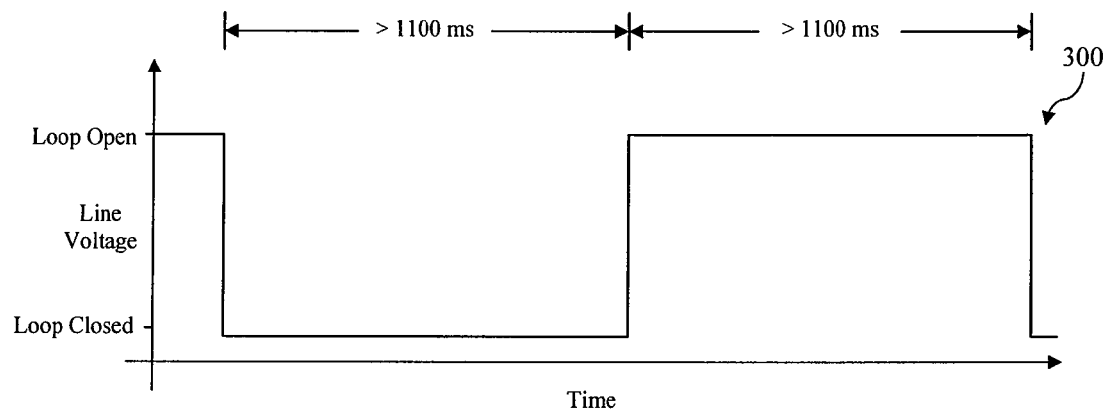
FIG. 3 depicts a signal appearing on a telephone line that could cause a conventional MTA to report repetitive off-hook/on-hook events to a Call Management Server (CMS).

Repetitive off-hook/on-hook events. In view of the state flow diagram 200 of FIG. 2, if the faulty telephone and/or wiring causes periodic loop closed and loop open conditions of 1100 ms or more in duration, this would cause MTA 112 to detect and report repetitive off-hook/on-hook events. FIG. 3 depicts an example of a signal 300 appearing on line 162 that could cause this to occur. The detection of repetitive off-hook/on-hook events will have the undesired effect of increasing Network-Based Called Signaling (NCS) traffic towards CMS 130.

Figure 4:
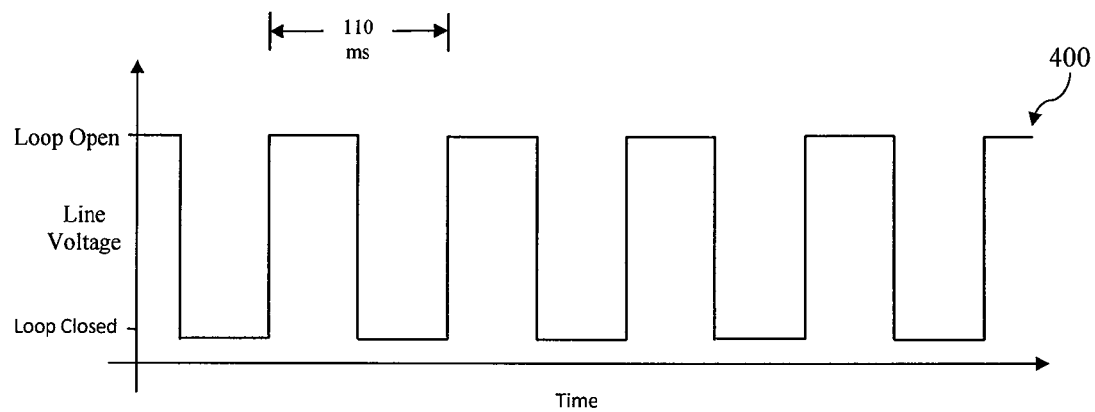
FIG. 4 depicts a signal appearing on a telephone line that could cause a conventional MTA to report an off-hook event, followed by repetitive pulse dial events.

Off-hook and repetitive pulse dial events. If the faulty condition is such that it cause periodic loop closed and loop open conditions for a duration of over 91 ms but less than 125 ms, this would cause MTA 112 to detect and report an off-hook event, followed by repetitive pulse dial events. FIG. 4 depicts an example signal 400 appearing on line 162 that could cause this to occur. A similar scenario can occur if MTA 112 detects a flash event while off-hook, followed by a valid digit string. This would result in a three-way call into a third-party line. Since both of these scenarios can result in real telephone calls being made, these are serious and potentially harmful scenarios for operator services.

Off-hook followed by random combination of pulse dial, flash and off-hook events. Depending on the type of fault and the duration of loop open and loop closed conditions on line 162, MTA 112 could detect and report an off-hook event, followed by any combination of incomplete pulse dial, flash on-hook events. Such random sequences of events would have the undesired effect of increasing NCS traffic toward CMS 130, but would rarely result in a real call being made. The latter event would occur only in a scenario such as that described in the previous paragraph in which the random sequence of pulse dial digits meets the requested digit map and calls are made.

In view of the above scenarios, it can be seen that there is a need for a system and method by which a system operator can remotely detect and diagnose an EMTA that has entered a chattering line state so that appropriate steps may be taken to avoid or rectify any of the problems that may result from this condition. As noted above, such problems include the detection and reporting of pulse dialing events and excess hook state (on-hook, off-hook) and flash events due to faulty conditions in the phone or on the line. The detection and reporting of pulse dialing events in this manner can be harmful because it may result in false telephone calls being made out of the EMTA. The placement of these false telephone calls imposes an unnecessary burden on the network and may result in a user being charged for long distance services. The detection and reporting of such excess hook state and flash events have the undesired effect of increasing network traffic toward the CMS and may also indicate that an EMTA is susceptible to the more harmful pulse dial condition as described above.

Figure 5:
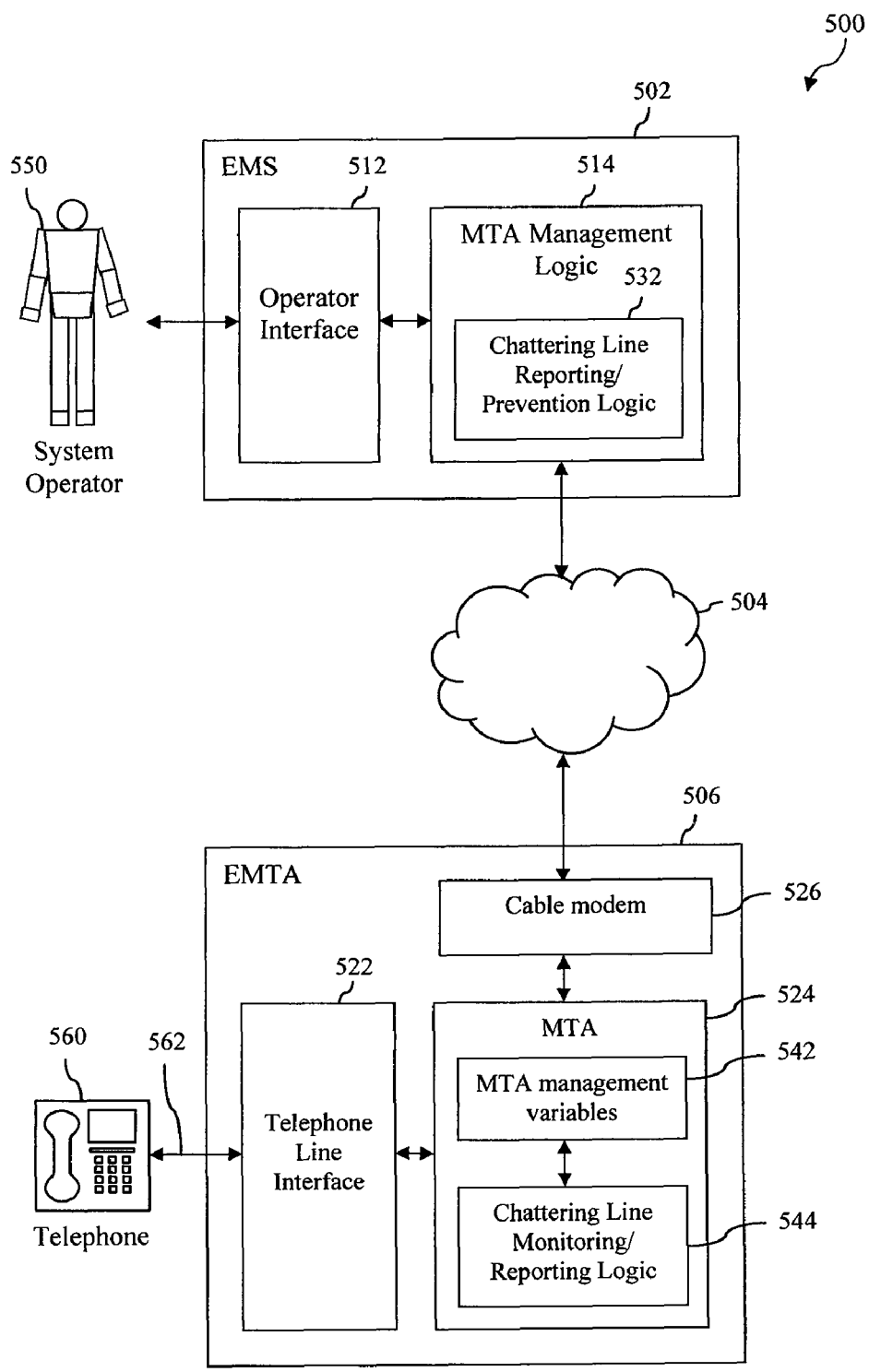
FIG. 5 is a block diagram of a system in accordance with an embodiment of the present invention that allows a system operator to remotely detect and diagnose an EMTA that has entered a chattering line state due to faulty customer premises equipment and/or wiring.

B. Chattering Line Detection System and Method in Accordance with an Embodiment of the Present Invention FIG. 5 depicts an example system 500 in accordance with an embodiment of the present invention that allows a system operator to remotely detect and diagnose an EMTA that has entered a chattering line state due to faulty customer premises equipment and/or wiring. Based on this detection and diagnosis, appropriate steps may then be taken to avoid or rectify any of the problems that may result from this condition.

As shown in FIG. 5, system 500 includes an EMTA 506 that is communicatively connected to an EMS 502 via a network infrastructure 504. Network infrastructure 504 is intended to represent a cable data network, head end access node and managed IP network that serve to connect EMTA 506 and EMS 502. Such elements are analogous to cable data network 102, access node 102, and managed IP network 104 as described above in reference to system 100 of FIG. 1.

EMTA 506 includes an MTA 524 that is connected to network infrastructure 504 via a cable modem 526 and that is connected to a telephone 560 via a telephone line interface 522 and a telephone line 562. Like MTA 112 described above in reference to system 100 of FIG. 1, MTA 524 is configured to monitor conditions on telephone line 562 and, based on the monitored conditions, to detect if certain signaling events have occurred that should be reported to a CMS. In addition, MTA 524 includes MTA management variables 542 that are used to provide status and statistical information to EMS 502 and to receive control information from EMS 502. Such control information is used to configure settings and functions within MTA 524. In one implementation, MTA management variables 542 comprise MIB variables that are accessed by a remote operator using well-known SNMP protocols, although the invention is not so limited.

As will be described in more detail herein, in accordance with embodiments of the present invention, MTA management variables 542 include certain variables that are used to facilitate the remote monitoring and detection of a chattering line condition within EMTA 506 as well as variables that can be used to prevent problematic reporting by MTA 524 of signaling events caused by such a condition.

MTA 524 further includes chattering line monitoring/reporting logic 544. Chattering line monitoring/reporting logic 544 is configured to detect unique conditions within MTA 524 that suggest that a chattering line problem may be present and to report information associated with such monitoring activities to EMS 502. The conditions that are monitored for by chattering line monitoring/reporting logic 544 will be also be described in more detail herein. In one implementation, chattering line monitoring/reporting logic 544 is implemented as firmware within EMTA 506, although the invention is not so limited.

EMS 502 is configured to allow a system operator 550 to manage, maintain and monitor network elements coupled to network infrastructure 506 via an operator interface 512. In particular, EMS 502 includes MTA management logic 514 that allows system operator 550 to manage, maintain and monitor MTAs such as MTA 524. Among other logic, MTA management logic 514 includes chattering line reporting/prevention logic 532 that is configured to allow network operator 550 to obtain information that indicates whether or not MTA 524 is in a chattering line state and to allow network operator 550 to take steps to prevent MTA 524 from reporting signaling events based on this condition. Chattering line reporting/prevention logic 532 is configured to perform these functions, in part, by reading from and writing to certain variables within MTA management variables 542. In one implementation, these reads and writes are carried out over network infrastructure 504 using well-known SNMP protocols, although the invention is not so limited.

The manner in which system 500 operates to perform chattering line detection and monitoring will now be described in more detail. Features relating to the detection and prevention of suspicious pulse dialing activity will first be described. Then, features relating to the detection of excess hook state and flash events will be described. Following this, a test for detecting line faults will be described. Finally, implementation details related to an example SNMP-based embodiment will be provided.

1. Detection of Suspicious and Excess Pulse Dial Activity

A key challenge regarding the monitoring of pulse dial events is the configuring MTA 524 to determine what type of pulse dial activity is "suspicious" or "excess" and to differentiate between pulse dialing due to line faults as opposed to real pulse dialing via a rotary-dial phone.

a. Provisionable Control Over Pulse Dial Reporting

Figure 6:
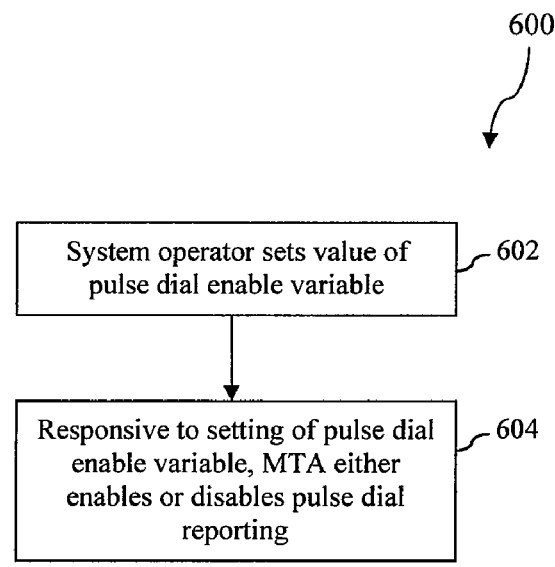
FIG. 6 depicts a flowchart of a method for enabling or disabling pulse dial reporting within an MTA in accordance with an embodiment of the present invention.

In accordance with one embodiment of the present invention, system operator 550 may disable pulse dial reporting by MTA 524 or any other MTA connected to network infrastructure 504. System operator 550 disables pulse dial reporting by interacting with MTA management logic 514 via operator interface 512. This interaction causes chattering line reporting/prevention logic 532 to set the value of a pulse dial enable variable within MTA management variables 542, wherein the value determines whether or not pulse dialing is enabled within MTA 524. Responsive to the setting of this variable, chattering line monitoring/reporting logic 544 within MTA 524 either enables or disables pulse dial reporting. A flowchart 600 generally representing this method is depicted in FIG. 6.

It is anticipated that the implementation of this feature alone would eliminate a vast majority of chattering line problems reported in the field. This is because today very few telephones used in the field actually deploy a rotary dial mechanism which requires pulse detection. By disabling pulse dial reporting on MTAs in the field that do not have a rotary telephone attached, any potential pulse dial events that could be reported as a result of line faults would be eliminated as well.

In accordance with the foregoing method, the system operator disables pulse dial reporting through the setting of an MTA management variable. However, in accordance with alternate embodiments of the present invention, the pulse dial reporting may be disabled automatically by EMS 502 or MTA 506 itself responsive to determining that a rotary telephone is not attached to MTA 524. The determination of whether a rotary telephone is attached to MTA 524 may be made automatically based on tracking the types of calls placed via MTA 524 over some predetermined period of time (e.g., a week after installation). For example, if all the calls placed over a period of time used dual-tone multi-frequency (touch-tone) dialing and MTA 524 doesn't detect any pulse dial digits over this period, the pulse dial detection may be automatically disabled by the MTA 524.

b. Monitoring of Internally-Rejected Pulse Dial Events

As discussed above in reference to state flow diagram 200 of FIG. 2, the timing requirements for detecting a pulse dial event by an MTA that complies with the Telcordia GR-506-CORE specification are fairly stringent. Consequently, it may be expected that random loop closed/open conditions on a telephone line will not always lead to pulse dial events being reported by an MTA. Essentially, the pulses would have to be between 91 and 125 ms in duration with a greater than 180 ms inter-digit interval in order to be reported as real pulse dial events. Given this, it is unlikely that line activity due to bad wiring or a bad telephone would be able to meet these stringent requirements without at least some pulses on the line being rejected by the MTA as false. A conventional MTA would simply reject the digits that do not meet the timing requirements, and continue to look for qualifying digits as though nothing had happened.

In contrast, in accordance with an embodiment of the present invention, chattering line monitoring/reporting logic 544 within MTA 524 is configured to monitor and report such internally rejected pulse dial events. In one embodiment, the internally rejected pulse dial events are those pulse dial events that do not fully meet the pulse dial timing requirements as defined by the Telcordia GR-506-CORE specification. One method for performing these functions will now be described flowchart 700 of FIG. 7. Although the method of flowchart 700 will be described with continued reference to system 500 of FIG. 5, the method is not limited to that implementation.

Figure 7:
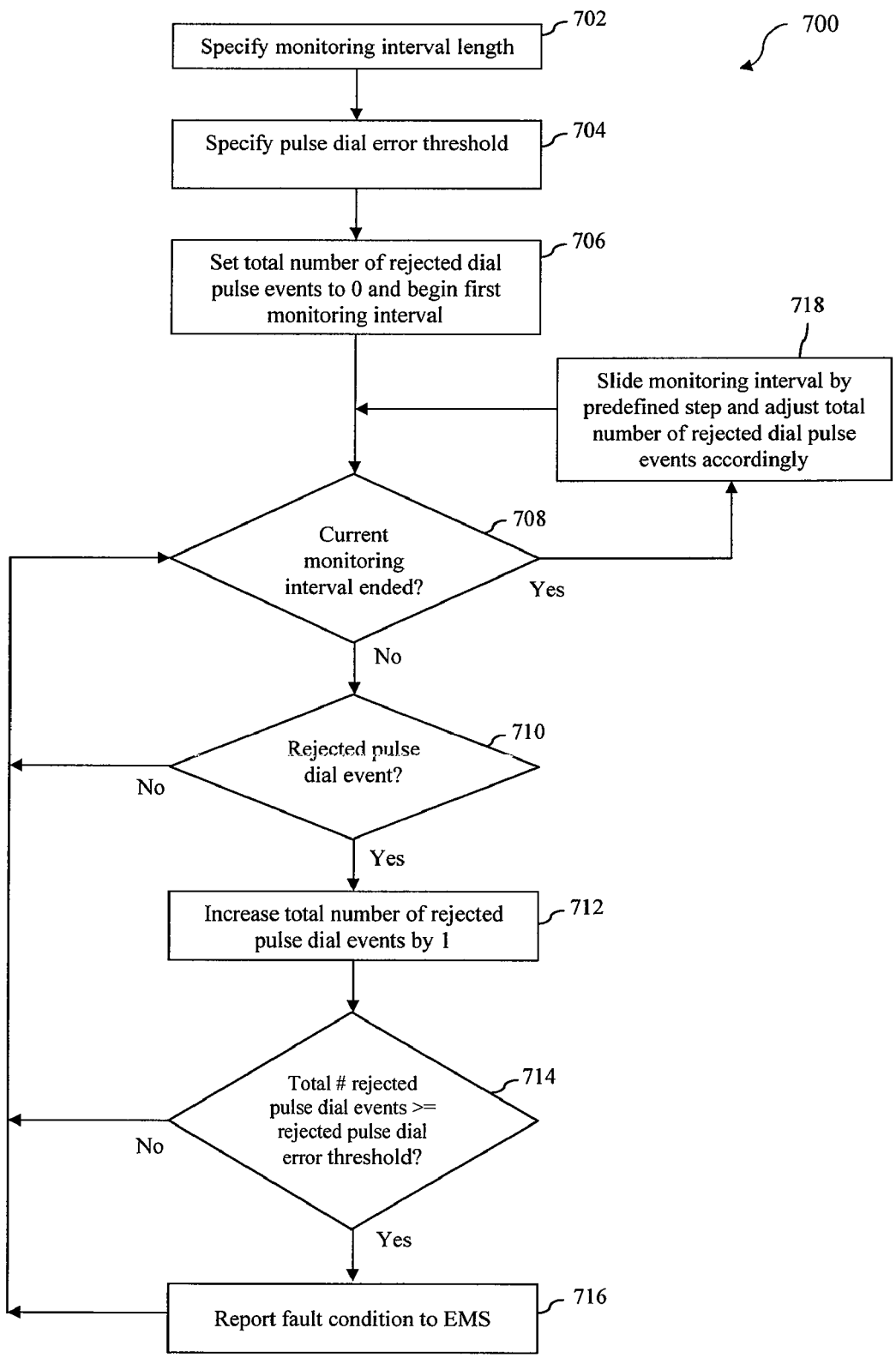
FIG. 7 depicts a flowchart of a method for monitoring and reporting internally-rejected pulse dial events within an MTA in accordance with an embodiment of the present invention.

As shown in FIG. 7, the method of flowchart 700 begins at step 702 in which system operator 550 uses EMS 502 to specify the length of a monitoring interval for detecting and reporting rejected pulse dial events. This is followed by step 704, in which system operator 550 uses EMS 502 to specify a rejected pulse dial error threshold for reporting rejected pulse dial events. System operator 550 specifies the monitoring interval length and rejected pulse dial error threshold by interacting with MTA management logic 514 via operator interface 512. This interaction causes chattering line reporting/prevention logic 532 to set the value of a monitoring interval length variable and a rejected pulse dial error threshold variable within MTA management variables 542, thereby making the monitoring interval length and rejected pulse dial error threshold available to chattering line monitoring/reporting logic 544 within MTA 524.

At step 706, chattering line monitoring/reporting logic 544 within MTA 112 sets a variable that represents a total number of rejected dial pulse events to zero and begins a monitoring interval having a length as specified by system operator 550 in step 702.

At decision step 708, chattering line monitoring/reporting logic 544 determines if the current monitoring interval has ended. If the current monitoring interval has ended, then chattering line monitoring/reporting logic 544 starts a new monitoring interval. Because this implementation of the present invention uses overlapping monitoring intervals, starting a new monitoring interval involves sliding the monitoring interval forward by a predefined step and adjusting the total number of rejected pulse dialing events accordingly as shown at step 718. The manner in which this step is performed will now be briefly described.

Figure 8:
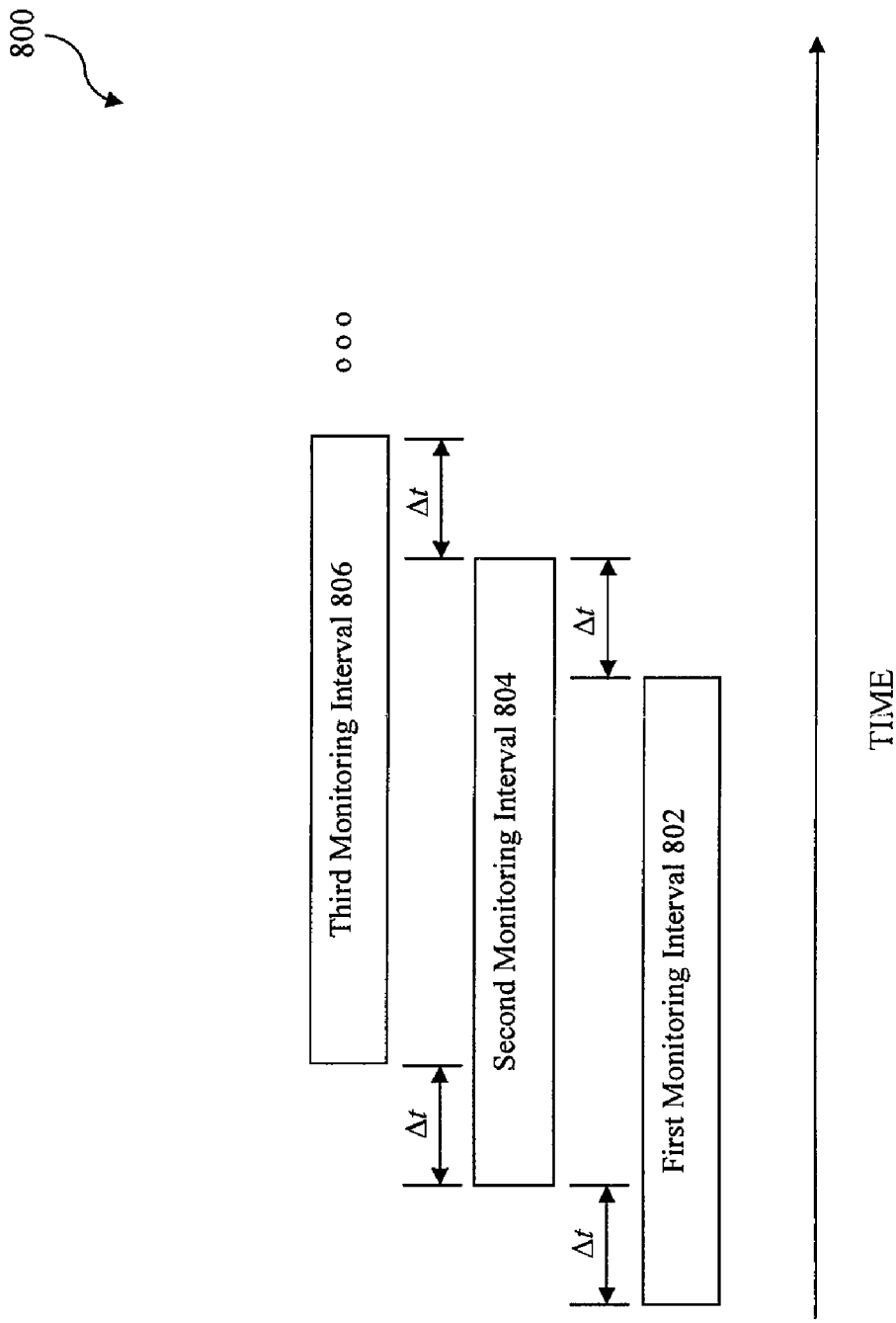
FIG. 8 is a conceptual illustration of overlapping monitoring intervals used for detecting and reporting events within an MTA in accordance with an embodiment of the present invention.

An embodiment of the present invention uses overlapping monitoring intervals for detecting and reporting rejected pulse dial events. An example of overlapping monitoring intervals is shown in FIG. 8. In particular, FIG. 8 depicts a series of overlapping monitoring intervals 800 comprising at least a first monitoring interval 802, a second monitoring interval 804 and a third monitoring interval 806. As shown in FIG. 8, the beginning and end of second monitoring interval 804 are time-shifted with respect to the beginning and end of first monitoring interval 802 by a predefined amount, or step, of time denoted $\Delta t$. Likewise, the beginning and end of third monitoring interval 806 are time-shifted with respect to the beginning and end of second monitoring interval 804 by the predefined step $\Delta t$. Depending on the implementation, the step size may be fixed (e.g., 1 minute regardless of the monitoring interval length) or flexible (e.g., a fraction of the monitoring interval length).

In accordance with such a scheme, starting a new monitoring interval may be achieved by extending the end of the current monitoring interval by predefined step $\Delta t$ (also referred to herein as "sliding" the monitoring interval) and then subtracting any rejected pulse dial events detected during the first $\Delta t$ of the preceding monitoring interval from the total number of rejected pulse dial events. For example, with reference to FIG. 8, starting second monitoring interval 804 would involve extending the end of first monitoring interval 802 by predefined step $\Delta t$ and then subtracting any rejected pulse dial events detected during the first $\Delta t$ of first monitoring interval 802 from the total number of rejected pulse dial events.

Using overlapping monitoring intervals in this manner improves the robustness of the detecting and reporting method and ensures that rejected pulse dial events are properly detected even in a case where a large number of such events fall at the end of one monitoring interval and the beginning of the next. If non-overlapping monitoring intervals were used, then beginning a new monitoring interval would involve resetting the total number of rejected pulse dial events to zero. Using this approach, if a large number of rejected pulse dial events occurred at the end of one monitoring interval but the total was below the pulse dial error threshold, then the expiration of the monitoring interval would result in the total number of rejected pulse dial events being reset to zero. Consequently, rejected pulse dial events occurring at the beginning of the next monitoring interval would not push the total number of rejected pulse dial events past the threshold necessary for reporting. By using overlapping monitoring intervals however, the rejected pulse dial events at the end of one monitoring interval would carry into the next monitoring interval and result in proper detection.

Returning now to decision step 708, if it is determined during that step that the current monitoring interval has not ended, then processing proceeds to decision step 710.

At decision step 710, chattering line monitoring/reporting logic 544 determines whether a rejected pulse dial event has occurred. In one implementation, a rejected pulse dial event is a pulse dial event that does not meet the timing requirements set forth in the PacketCable™ specifications and the telephony specifications referenced therein, such as the Telcordia GR-506-CORE specification. If chattering line monitoring/reporting logic 544 determines that a rejected pulse dial event has not occurred then control returns to decision step 708 to determine if the current monitoring interval has ended.

However, if chattering line monitoring/reporting logic 544 determines that a rejected pulse dial event has occurred, then chattering line monitoring/reporting logic 544 increases the total number of rejected pulse dial events by one as shown at step 712. Then, at decision step 714, chattering line monitoring/reporting logic 544 determines whether the total number of rejected pulse dial events equals or exceeds the rejected pulse dial error threshold that was specified in step 704. If the total number of rejected pulse dial events does not equal or exceed the rejected pulse dial error threshold, then control returns to decision step 708 to determine if the current monitoring interval has ended.

However, if chattering line monitoring/reporting logic 544 determines that the total number of rejected pulse dial events equals or exceeds the rejected pulse dial error threshold, then chattering line monitoring/reporting logic 544 reports a fault condition to EMS 502 as shown at step 716. Chattering line monitoring/reporting logic 544 may report the fault condition by logging a vendor-defined PacketCable™ event with EMS 502 to alert system operator 550 of the fault condition. After step 716, control returns to decision step 708 to determine if the current monitoring interval has ended.

The foregoing method of flowchart 700 allows MTA 524 to report suspicious pulse dial activity even before a valid dial string has been detected or calls are made due to a faulty telephone and/or wiring. The method thus enables system operator 550 to be made aware of potential trouble with the telephone and/or wiring before any real harm is done.

In a situation in which a faulty telephone and/or wiring is causing MTA 524 to detect loop closed/loop open events on line 562, it is likely that MTA 524 would reject more loop closed/open conditions as a false pulse dial event than as a valid dialed digit. Therefore, method 700 provides a way to detect suspicious pulse dial activity on line 562 by keeping track of internally-rejected pulse dial events and by reporting a fault condition to EMS 502 when a threshold has been reached. Under normal operating conditions, there should be no rejected digits at all, and thus the threshold may be set as low as zero. However, based on the assumption that some customer premises equipment may not be fully compliant with the relevant specifications and to allow for some margin of error, method 700 allows for the use of a configurable threshold. Furthermore, in accordance with method 700, MTA 524 monitors the total number of internally-rejected pulse dial events over a configurable time period and reports a fault condition whenever the configurable threshold is reached within the time period.

In an alternative implementation, MTA 524 may monitor the number of internally-rejected pulse dial events within a given call or at such time as the digit string is sent to the CMS. However, given the uncertainty related to the faulty telephone and/or wiring, there is no guarantee that a call would ever end (i.e., no on-hook detection) or that a valid digit string would ever be detected (i.e., all digit attempts are internally rejected). Consequently, this alternative approach may not detect and report the condition as soon as the approach set forth in flowchart 700. Therefore, the time-based monitoring approach described above in reference to flowchart 700 of FIG. 7 may be preferred.

c. Monitoring of Digit Map Mismatches and Unexpected Digit Events

To further increase the chance of detecting faulty telephone and/or wiring giving rise to chattering line problems, an embodiment of the present monitors for digit map mismatches and unexpected digit events and reports information associated with such monitoring activity to EMS.

In accordance with the PacketCable™ specification, a CMS provides MTA 524 with a digit map that corresponds to a valid digit map for a given operator. MTA 524 is configured to collect digits based on activity on telephone line 562 and attempt to match them to the given digit map. If the dialed digits were a result of a fault telephone and/or faulty wiring, it is unlikely that MTA 524 would detect a perfect match. Rather, it is more likely that MTA 524 would detect an impossible match, an under-qualified match, or an over-qualified match. An impossible match results where the dialed string does not match the digit map. An under-qualified match results from a partial match (i.e., where not enough digits were entered). An over-qualified match results where no further digits could possibly result in a match (i.e., where too many digits were entered).

In addition, MTA 524 is configured to collect pulse dial events internally even when digit collection has not been requested by the CMS. Normally, digit collection is requested when a telephone goes off-hook to dial a call or upon a flash event while off-hook to dial into a third-party call.

An embodiment of the present invention monitors and reports such digit map mismatches (impossible, under- and over-qualified) as well as unexpected digit events (when digit collection signal request is not active), thereby allowing MTA 524 to notify system operator 550 of potential trouble associated with telephone 560/telephone line 562. One method for performing these functions will now be described flowchart 900 of FIG. 9. Although the method of flowchart 900 will be described with continued reference to system 500 of FIG. 5, the method is not limited to that implementation.

Figure 9:
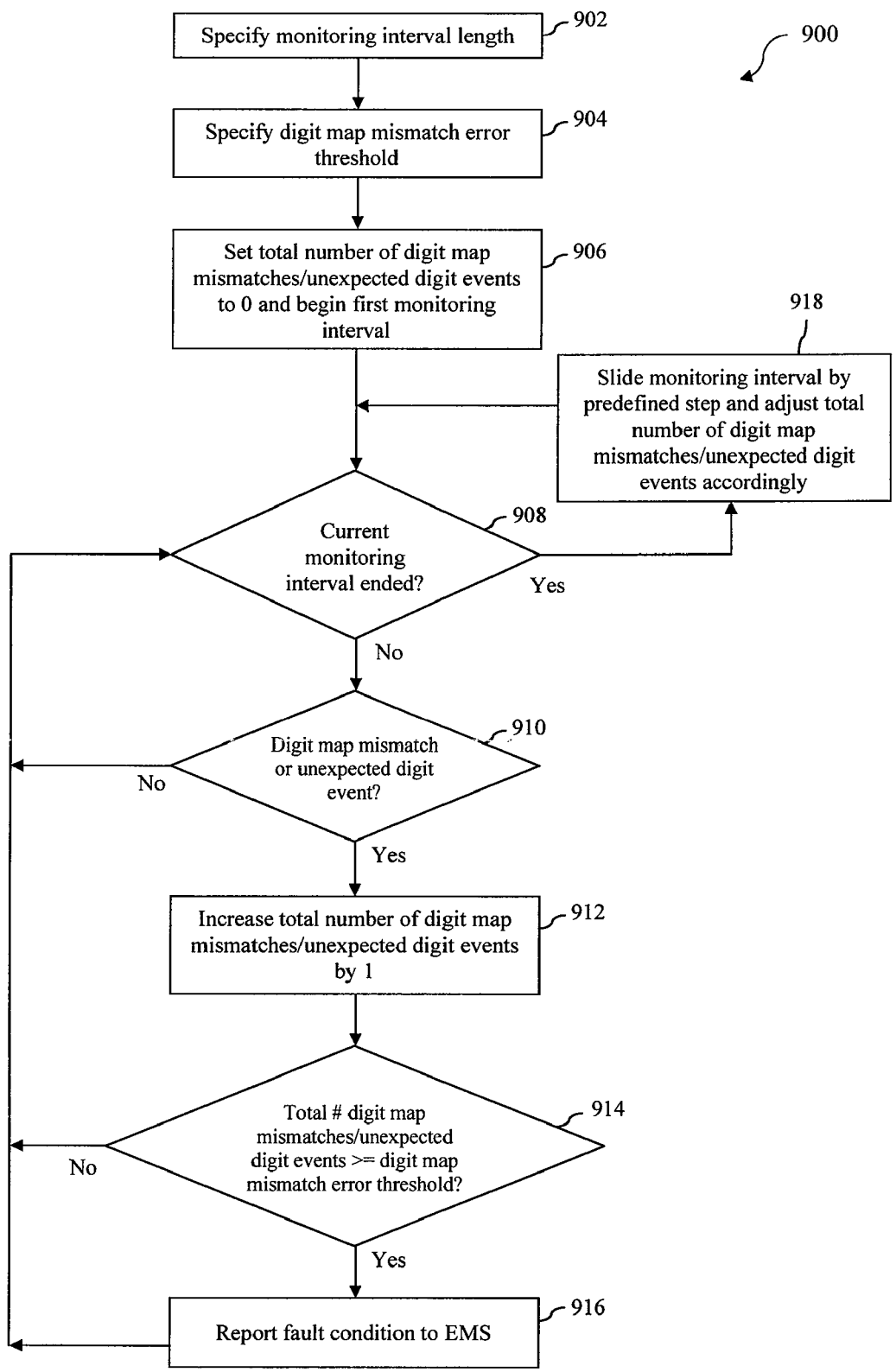
FIG. 9 depicts a flowchart of a method for monitoring and reporting digit map mismatches and unexpected digit events within an MTA in accordance with an embodiment of the present invention.

As shown in FIG. 9, the method of flowchart 900 begins at step 902 in which system operator 550 uses EMS 502 to specify the length of a monitoring interval for detecting and reporting digit map mismatches and unexpected digit events. This is followed by step 904, in which system operator 550 uses EMS 502 to specify a digit map mismatch error threshold for reporting digit map mismatches and unexpected digit events. System operator 550 specifies the monitoring interval length and digit map mismatch error threshold by interacting with MTA management logic 514 via operator interface 512. This interaction causes chattering line reporting/prevention logic 532 to set the value of a monitoring interval length variable and a digit map mismatch error threshold variable within MTA management variables 542, thereby making the monitoring interval length and digit map mismatch error threshold available to chattering line monitoring/reporting logic 544 within MTA 524.

At step 906, chattering line monitoring/reporting logic 544 within MTA 112 sets a variable that represents a total number of digit map mismatches/unexpected digit events to zero and begins a monitoring interval having a length as specified by system operator 550 in step 902.

At decision step 908, chattering line monitoring/reporting logic 544 determines if the current monitoring interval has ended. If the current monitoring interval has ended, then chattering line monitoring/reporting logic 544 starts a new monitoring interval. Because this implementation of the present invention uses overlapping monitoring intervals, starting a new monitoring interval involves sliding the monitoring interval forward by a predefined step and adjusting the total number of digit map mismatches/unexpected digit events accordingly as shown at step 918. An approach to managing overlapping monitoring windows was described above in reference to flowchart 700 and thus will not be repeated in this section for the sake of brevity. If the monitoring interval has not ended, then processing proceeds to decision step 810.

At decision step 910, chattering line monitoring/reporting logic 544 determines whether a digit map mismatch or unexpected digit event has occurred. A digit map mismatch is detected when a dial string attempt does not match the requested digit map from the CMS. Digit map mismatches includes impossible, under- and over-qualified matches. An unexpected digit event is detected when a digit event occurs while the digit collection signal request from the CMS is not active. If chattering line monitoring/reporting logic 544 determines that neither a digit map mismatch nor an unexpected digit event has occurred, then control returns to decision step 908 to determine if the current monitoring interval has ended.

However, if chattering line monitoring/reporting logic 544 determines that either a digit map mismatch or an unexpected digit event has occurred, then chattering line monitoring/reporting logic 544 increases the total number of digit map mismatches/unexpected digit events by one as shown at step 912. Then, at decision step 914, chattering line monitoring/reporting logic 544 determines whether the total number of digit map mismatches/unexpected digit events equals or exceeds the digit map mismatch error threshold that was specified in step 904. If the total number of digit map mismatches/unexpected digit events does not equal or exceed the digit map mismatch error threshold, then control returns to decision step 908 to determine if the current monitoring interval has ended.

However, if chattering line monitoring/reporting logic 544 determines that the total number of digit map mismatches/unexpected digit events equals or exceeds the digit map mismatch error threshold, then chattering line monitoring/reporting logic 544 reports a fault condition to EMS 502 as shown at step 916. Chattering line monitoring/reporting logic 544 may report the fault condition by logging a vendor-defined PacketCable™ event with EMS 502 to alert system operator 550 of the fault condition. After step 916, control returns to decision step 808 to determine if the monitoring interval has ended.

The foregoing method of flowchart 900 allows digit map mismatches and unexpected digit events to be monitored over a configurable time frame and ensures that an event notification is sent to EMS 502 when a configurable threshold has been reached.

2. Detection of Excess Hook State and Flash Events

As reflected in the state flow diagram 200 of FIG. 2, the timing requirements set forth in the Telcordia GR-506-CORE specification for detecting hook state and flash events are not as stringent as those set forth for detecting a pulse dial event. Essentially, the specification requires that any loop closed condition of greater than 100 ms should result in the detection an off-hook event, any loop open condition of greater than 1100 ms should result in the detection of an on-hook event, while loop open/closed events having a duration of 300 to 1100 ms should result in the detection of a hook-flash event. A PacketCable™-compliant MTA is required to notify the CMS when such events are detected and there are little or no rejection criteria that can be applied to monitor for early fault behavior signs. One potential approach would be to monitor for loop closed conditions of less than 100 ms in duration, but since such conditions would not result in the reporting of an event in any case, there is would be little benefit to doing so.

An embodiment of the present invention is premised on the understanding that the only way an MTA could effectively monitor for suspicious hook state or flash events on a telephone line is to monitor for an unusually high rate of events of this type. A typical telephone call consists of a sequence of events consisting of an off-hook event, a digit notification event, a conversation, and finally an on-hook event. Therefore, a typical telephone call would have 2 hook events and 5 (extension) to 9 (local call with area code) digits, but could have as many as 19 digits, which is the maximum number of digits supported by the digit map. A typical short telephone call would last about one minute. In a worst case scenario with a maximum of 19 digits, including 2 hook state changes, there can be 21 total hook state and pulse dial events for a given short call. Within an hour timeframe, even a very frequent telephone user should not make more than one call per minute. Therefore, there should not be more than 21*60 hook state and pulse dial events total. A faulty telephone and/or telephone line generating repetitive hook state, flash or pulse dial events could report the same 21 events within only 9.8 s.

Of course, these numbers are intended to represent the worst case. In practice, it is unrealistic that a user would make more than 10 calls per hour (unless the telephone was deployed, for example, in a customer call center) with a 9 digit dial string. Consequently, a monitoring scheme described herein includes a configurable monitoring interval and reporting threshold.

In view of the foregoing, an embodiment of the present invention monitors the number of events that are detected within a given timeframe and then reports suspicious activity if the rate exceeds a certain preconfigured threshold (for example, more than 21 events or more than 1200 events per hour). One method for performing these functions will now be described flowchart 1000 of FIG. 10. Although the method of flowchart 1000 will be described with continued reference to system 500 of FIG. 5, the method is not limited to that implementation.

Figure 10:
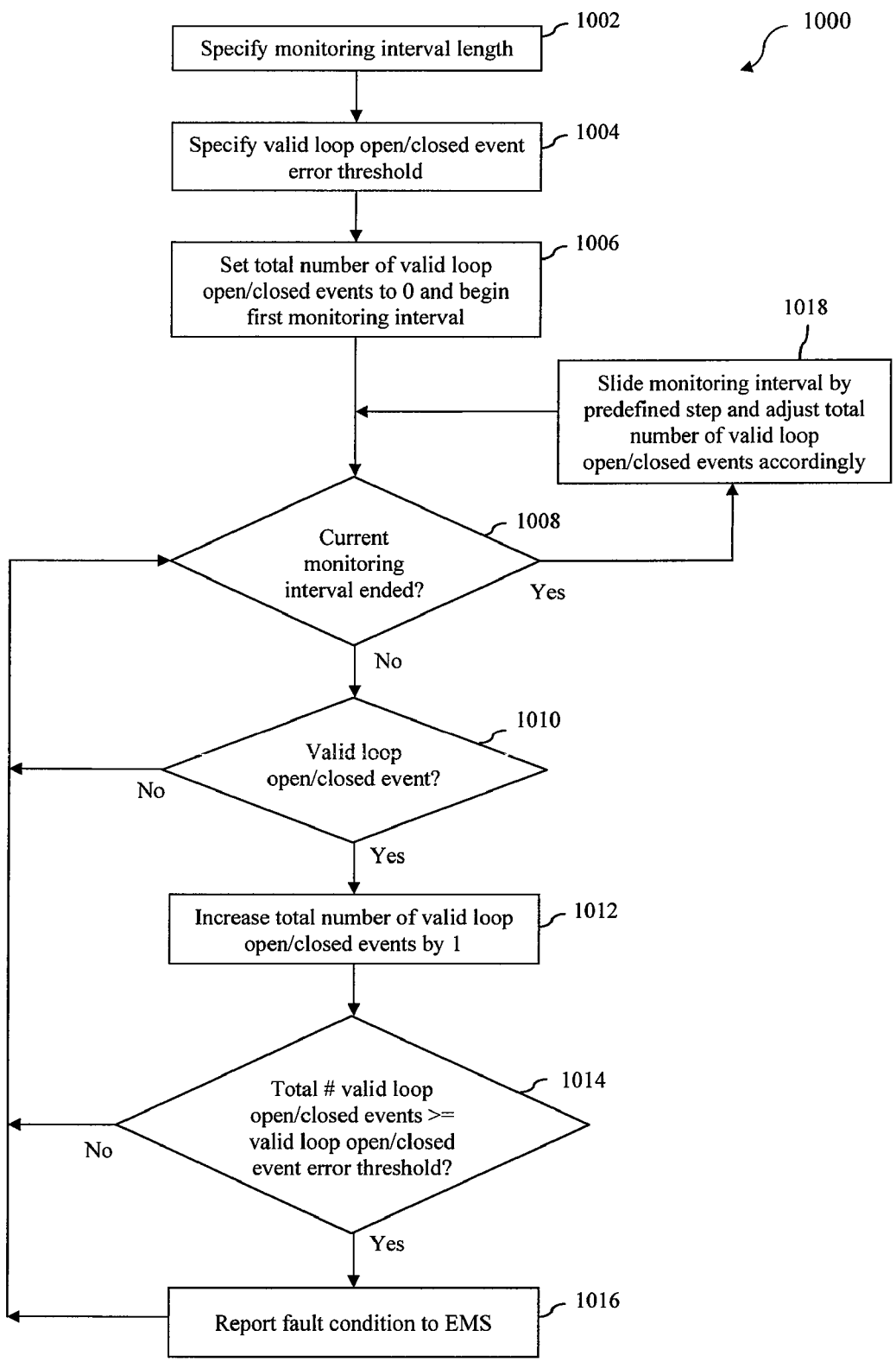
FIG. 10 depicts a flowchart of a method for monitoring and reporting excessive loop open/closed events within an MTA in accordance with an embodiment of the present invention.

As shown in FIG. 10, the method of flowchart 1000 begins at step 1002 in which system operator 550 uses EMS 502 to specify the length of a monitoring interval for detecting and reporting excess loop open/closed events. This is followed by step 1004, in which system operator 550 uses EMS 502 to specify a valid loop open/closed event error threshold for reporting excess loop open/closed events. System operator 550 specifies the monitoring interval length and valid loop open/closed event error threshold by interacting with MTA management logic 514 via operator interface 512. This interaction causes chattering line reporting/prevention logic 532 to set the value of a monitoring interval variable and a valid loop open/closed event error threshold variable within MTA management variables 542, thereby making the monitoring interval and valid loop open/closed event error threshold available to chattering line monitoring/reporting logic 544 within MTA 524.

At step 1006, chattering line monitoring/reporting logic 544 within MTA 112 sets a variable that represents a total number of valid loop open/closed events to zero and begins a monitoring interval having a length as specified by system operator 550 in step 1002.

At decision step 1008, chattering line monitoring/reporting logic 544 determines if the current monitoring interval has ended. If the current monitoring interval has ended, then chattering line monitoring/reporting logic 544 starts a new monitoring interval. Because this implementation of the present invention uses overlapping monitoring intervals, starting a new monitoring interval involves sliding the monitoring interval forward by a predefined step and adjusting the total number of valid loop open/closed events accordingly as shown at step 1018. An approach to managing overlapping monitoring windows was described above in reference to flowchart 700 and thus will not be repeated in this section for the sake of brevity. If the current monitoring interval has not ended, then processing proceeds to decision step 1010.

At decision step 1010, chattering line monitoring/reporting logic 544 determines whether a valid loop open/closed event has occurred. Valid loop open/closed events include valid hook state (on-hook and off-hook), flash and pulse dial events. If chattering line monitoring/reporting logic 544 determines that a valid loop open/closed event has not occurred then control returns to decision step 1008 to determine if the current monitoring interval has ended.

However, if chattering line monitoring/reporting logic 544 determines that a valid loop open/closed event has occurred then chattering line monitoring/reporting logic 544 increases the total number of valid loop open/closed events by one as shown at step 1012. Then, at decision step 1014, chattering line monitoring/reporting logic 544 determines whether the total number of valid loop open/closed events equals or exceeds the valid loop open/closed event error threshold that was specified in step 1004. If the total number of valid loop open/closed events does not equal or exceed the valid loop open/closed event error threshold, then control returns to decision step 1008 to determine if the current monitoring interval has ended.

However, if chattering line monitoring/reporting logic 544 determines that the total number of valid loop open/closed events equals or exceeds the valid loop open/closed event error threshold, then chattering line monitoring/reporting logic 544 reports a fault condition to EMS 502 as shown at step 1016. Chattering line monitoring/reporting logic 544 may report the fault condition by logging a vendor-defined PacketCable™ event with EMS 502 to alert system operator 550 of the fault condition. After step 1016, control returns to decision step 1008 to determine if the current monitoring interval has ended.

In further accordance with the foregoing method of flowchart 900, system operator 550 could modify the configurable monitoring interval and error threshold based on usage patterns associated with a given deployment. This allows system operator 550 to detect suspicious activity and take corrective action in a manner that accounts for installation-specific usage patterns.

3. Detection of Line Faults

In accordance with an embodiment of the present invention, MTA 524 is configured to run a Receiver Off-hook (ROH) line-diagnostic test responsive to the detection of a probable fault condition and to report the results of the ROH line-diagnostic test to a system operator. One method for performing these functions will now be described flowchart 1100 of FIG. 11. Although the method of flowchart 1100 will be described with continued reference to system 500 of FIG. 5, the method is not limited to that implementation.

Figure 11:
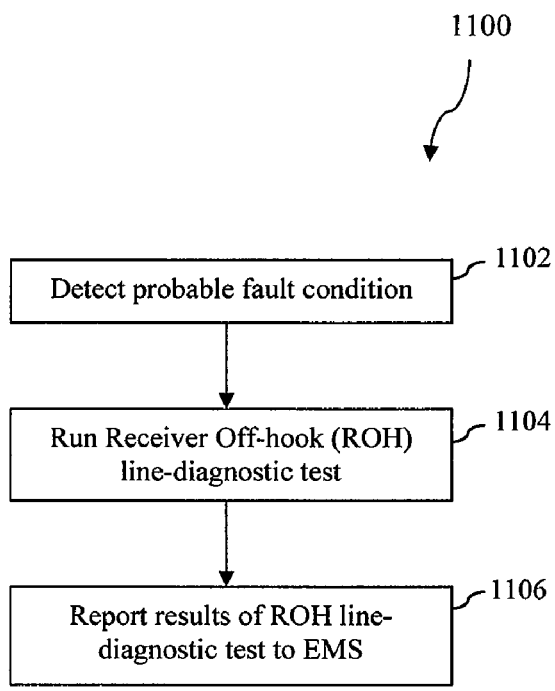
FIG. 11 depicts a flowchart of a method for performing a test for detecting a line fault in accordance with an embodiment of the present invention.

As shown in FIG. 11, the method of flowchart 1100 begins at step 1102 in which chattering line monitoring/reporting logic 544 within MTA 524 detects a probable fault condition associated with telephone 560 and/or telephone line 562. As discussed above, the probable fault condition may be detected when a total number of rejected pulse dial events, a total number of digit map mismatches/unexpected digit events, or a total number of valid loop open/closed events exceeds a threshold over a particular monitoring interval.

At step 1104, responsive to detecting the probable fault condition, chattering line monitoring/reporting logic 544 performs an ROH line-diagnostic test. In one implementation, chattering line monitoring/reporting logic 544 is configured to perform the ROH line-diagnostic test immediately after detecting an early indication of the next off-hook transition, which could be a real off-hook event or part of a flash or pulse dial event. The ROH-line diagnostic test may be repeated a number of times to resolve whether there is a receiver off-hook or a resistive fault (short).

In one embodiment, there are three possible outcomes of the ROH line-diagnostic test. The first possible outcome is that the line is on-hook during part of the test. This indicates that the off-hook condition was removed before the test was completed and that the results of this test may be discarded. The second possible outcome is that a non-linear resistance less than the maximum measurable by the ROH line-diagnostic test is detected more than once. This indicates a receiver off-hook. The third possible result is that a linear resistance less than the maximum resistance measurable by the ROH line-diagnostic test is detected more than once. This indicates a short/fault. In one implementation, the maximum resistance measurable by the ROH line-diagnostic test is in the range of 850-900 Ohms.

At step 1106, chattering line monitoring/reporting logic 544 reports the results of the ROH line-diagnostic test to EMS 502. Chattering line monitoring/reporting logic 544 may report the results by logging a vendor-defined PacketCable™ event with EMS 502. The results may be logged along with the probable fault condition that triggered the test execution.

By providing the results to EMS 502 in this manner, the method of flowchart 1100 enables system operator 550 to use such results in determining the severity of the fault condition. This will enable system operator 550 to determine if a maintenance visit to the customer premises is warranted to address the condition or if tweaking a configurable monitoring interval and/or configurable reporting threshold associated with the fault condition is sufficient. For example, if the ROH line-diagnostic test was triggered by excessive pulse dial events and the result of the test indicated a fault, then a maintenance visit to the customer premises is most likely necessary to resolve the condition. However, if the result of the ROH line-diagnostic test is inconclusive (i.e., the off-hook condition was removed before the test was completed and that the results of this test may be discarded), then this may simply indicate that a child was playing with a rotary dial phone.

4. Example SNMP-Based Implementation

An embodiment of the present invention uses SNMP for communicating between EMS 502 and EMTA 506. This section provides implementation details for such an SNMP-based embodiment. These details are provided by way of example only, and are not intended to limit the present invention.

To implement the feature described above with respect to disabling pulse dial reporting on a per endpoint basis, the following private MIB may be introduced:

```
emtaSignalingEndptCtrlPuseDialEnable OBJECT-TYPE
    SYNTAX        TruthValue
    MAX-ACCESS    read-write
    STATUS        current
    DESCRIPTION
        "This object controls pulse dialing detection for the Endpoint.
        When set to 'true(1)', pulse dialing detection is enable and the
        EMTA will report detected dial pulses to the CMS. A dial
        pulse is any loop closed/open event on the given Endpoint that
        meets the pulse-dial timing requirements as defined by the
        PacketCable specifications and telephony specifications
        referenced therein. When set to 'false(2)', pulse dialing
        detection is disabled. The value of this object must be set via
        the MTA config file for persistence."
    DEFVAL    {true}
    ::= { emtaSignalingEndptCtrlEntry X}
```

To implement the features described above with respect to monitoring rejected pulse dial events, digit map mismatches and unexpected digit events, the following three private MIBs may be introduced:

```
emtaSignalingChatterLineMonitorInterval OBJECT-TYPE
    SYNTAX        Unsigned32
    UNITS         "minutes"
    MAX-ACCESS    read-write
    STATUS        current
    DESCRIPTION
        "This object specifies the monitoring interval for the conditions
        of interest when detecting a chattering line fault. If the
        specified threshold for a given error condition is reached or
        exceeded over this monitoring interval, the EMTA will log a
        vendor-defined PacketCable event to alert the operator of the
        fault condition. The value of this object must be set via the
        MTA config file for persistence."
    DEFVAL    {60}
    ::= { emtaMgmtSignalingControl X}
emtaSignalingPulseDialRejectThreshold OBJECT-TYPE
    SYNTAX        Unsigned32
    MAX-ACCESS    read-write
    STATUS        current
    DESCRIPTION
        "This object specifies the rejected dial pulse error threshold.
        Dial pulse events are rejected if they do not meet the timing
        requirements defined by the PacketCable specifications and
        telephony specifications, such as GR-506-CORE, referenced
        therein. If this threshold is reached or exceeded over the
        monitoring interval as configured via
        emtaSignalingChatterLineMonitorInterval, the EMTA will log
        a vendor-defined PacketCable event to alert the operator of the
        fault condition. The value of this object must be set via the
        MTA config file for persistence."
    DEFVAL    {0}
    ::= { emtaMgmtSignalingControl X}
emtaSignalingDigitMapMismatchThreshold OBJECT-TYPE
    SYNTAX        Unsigned32
    MAX-ACCESS    read-write
    STATUS        current
```

-continued

```
DESCRIPTION
    "This object specifies the digit map mismatch error threshold.
    A mismatch occurs when a dialstring does not match the
    specified digit map or the dialstring is unexpected. A dialstring
    is considered non-matching when there is an impossible, under-
    or over-qualified match as defined by the PacketCable NCS
    specification. A dialstring is considered unexpected when it
    happens while digit collection signal request is not outstanding
    as defined by the PacketCable NCS specification. If this
    threshold is reached or exceeded over the monitoring interval
    as configured via emtaSignalingChatterLineMonitorInterval,
    the EMTA will log a vendor-defined PacketCable event to alert
    the operator of the fault condition. The value of this object
    must be set via the MTA config file for persistence."
DEFVAL     {0}
: : = { emtaMgmtSignalingControl X}
```

To implement the features described above with respect to monitoring excessive loop open/closed events, the following private MIB may be introduced:

```
emtaSignalingLoopOpenCloseThreshold OBJECT-TYPE
    SYNTAX       Unsigned32
    MAX-ACCESS   read-write
    STATUS       current
    DESCRIPTION
        "This object specifies the valid loop open/closed event error
        threshold. Valid loop open/closed events (on-hook, off-hook,
        pulse dial and flash) are defined by the PacketCable
        specification and telephony specifications, such as GR-506-
        CORE, referenced therein. If this threshold is reached or
        exceeded over the monitoring interval as configured via
        emtaSignalingChatterLineMonitorInterval, the EMTA will log
        a vendor-defined PacketCable event to alert the operator of the
        fault condition. The value of this object must be set via the
        MTA config file for persistence."
    DEFVAL     {0}
    : : = { emtaMgmtSignalingControl X}
```

Note that in accordance with this particular implementation, the same monitoring interval applies to all three monitored conditions (rejected pulse dial events, digit map mismatches/unexpected digit events, and valid loop open/closed events).

The following table provide an example SNMP interface by which MTA 524 can report individual detected conditions:

| Event Type | Enterprise ID | Event ID | Event Text | Level |
|---|---|---|---|---|
| Alarm = Trap | 2863 | 48 | "INFO: Chattering line warning-Excessive pulse dial failures (AALN/x): ROH status | Info |
| Alarm = Trap | 2863 | 49 | "INFO: Chattering line warning-Excessive digit map failures (AALN/x): ROH status | Info |
| Alarm = Trap | 2863 | 50 | "INFO: Chattering line warning-Excessive line event activity (AALN/x): ROH status | Info |

Event IDs 48, 49 and 50 correspond to features described above with respect to monitoring excessive rejected pulse dial events, digit map mismatches/unexpected digit events, and valid loop open/closed events. The ROH status has the following meaning for all three monitored conditions: (1) 0001-discard (line on-hook during part of the test); (2) 0002-receiver off-hook; and (3) 0003-short/fault on the line.

C. Conclusion

While various embodiments of the present invention have been described above, it should be understood that they have been presented by way of example only, and not limitation. It will be understood by those skilled in the relevant art(s) that various changes in form and details may be made to the embodiments of the present invention described herein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for detecting a chattering line condition in a voice-enabled cable modem, comprising:
   monitoring for pulse dialing activity caused by a faulty telephone and/or telephone line connected to the voice-enabled cable modem; and
   responsive to detecting pulse dialing activity caused by a faulty telephone and/or telephone line connected to the voice-enabled cable modem, reporting a fault condition to a management system that is external with respect to the voice-enabled cable modem.

2. The method of claim 1, wherein monitoring for pulse dialing activity caused by a faulty telephone and/or telephone line connected to the voice-enabled cable modem comprises:
   monitoring internally-rejected pulse dial events within the voice-enabled cable modem.

3. The method of claim 2, wherein monitoring internally-rejected pulse dial events within the cable modem comprises:
   determining if a total number of internally-rejected pulse dial events exceeds a predefined threshold within a predefined monitoring interval.

4. The method of claim 3, further comprising:
   setting the predefined threshold and the predefined monitoring interval by a system operator.

5. The method of claim 1, further comprising:
   running a receiver off-hook line-diagnostic test responsive to detecting pulse dialing activity caused by a faulty telephone and/or telephone line connected to the voice-enabled cable modem;
   wherein reporting a fault condition to a management system that is external with respect to the voice-enabled cable modem includes reporting results of the receiver off-hook line-diagnostic test.

6. A method for detecting a chattering line condition in a voice-enabled cable modem, comprising:
   monitoring for digit map mismatches and unexpected digit events caused by a faulty telephone and/or telephone line connected to the voice-enabled cable modem; and
   responsive to detecting digit map mismatches and unexpected digit events caused by a faulty telephone and/or telephone line connected to the voice-enabled cable modem, reporting a fault condition to a management system that is external with respect to the voice-enabled cable modem.

7. The method of claim 6, wherein monitoring for digit map mismatches and unexpected digit events caused by a faulty telephone and/or telephone line connected to the voice-enabled cable modem comprises:
   determining if a total number of digit map mismatches and unexpected digit events exceeds a predefined threshold within a predefined monitoring interval.

8. The method of claim 7, further comprising:
setting the predefined threshold and the predefined monitoring interval by a system operator.

9. The method of claim 6, further comprising:
running a receiver off-hook line-diagnostic test responsive to detecting digit map mismatches and unexpected digit events caused by a faulty telephone and/or telephone line connected to the voice-enabled cable modem;
wherein reporting a fault condition to a management system that is external with respect to the voice-enabled cable modem includes reporting results of the receiver off-hook line-diagnostic test.

10. A method for detecting a chattering line condition in a voice-enabled cable modem, comprising:
monitoring for excessive hook state and/or flash events caused by a faulty telephone and/or telephone line connected to the voice-enabled cable modem;
responsive to detecting excessive hook state and/or flash events caused by a faulty telephone and/or telephone line connected to the voice-enabled cable modem, reporting a fault condition to a management system that is external with respect to the voice-enabled cable modem.

11. The method of claim 10, wherein monitoring for excessive hook state and/or flash events caused by a faulty telephone and/or telephone line connected to the voice-enabled cable modem comprises:
determining if a total number of valid loop closed/loop open events exceeds a predefined threshold within a predefined monitoring interval, wherein the valid loop closed/loop open events may include one or more of an off-hook event, on-hook event, pulse dial event, or flash event.

12. The method of claim 11, further comprising:
setting the predefined threshold and the predefined monitoring interval by a system operator.

13. The method of claim 10, further comprising:
running a receiver off-hook line-diagnostic test responsive to detecting excessive hook state and/or flash events caused by a faulty telephone and/or telephone line connected to the voice-enabled cable modem;
wherein reporting a fault condition to a management system that is external with respect to the voice-enabled cable modem includes reporting results of the receiver off-hook line-diagnostic test.

14. An embedded multimedia terminal adapter, comprising:
a multimedia terminal adapter;
a cable modem communicatively connected to the multimedia terminal adapter, the cable modem configured to provide a connection between the multimedia terminal adapter and a cable data network; and
a telephone line interface communicatively connected to the multimedia terminal adapter, the telephone line interface configured to provide a connection between a telephone line and the multimedia adapter;
wherein the multimedia terminal adapter includes logic configured to monitor for pulse dialing activity caused by a faulty telephone and/or telephone line connected to the multimedia terminal adapter via the telephone line interface and to report a fault condition to a management system via the cable data network responsive to detecting such pulse dialing activity.

15. The embedded multimedia terminal adapter of claim 14, wherein the logic is configured to monitor for pulse dialing activity caused by a faulty telephone and/or telephone line connected to the multimedia terminal adapter by monitoring internally-rejected pulse dial events.

16. The embedded multimedia terminal adapter of claim 15, wherein the logic is configured to monitor internally-rejected pulse dial events by determining if a total number of internally-rejected pulse dial events exceeds a predefined threshold within a predefined monitoring interval.

17. The embedded multimedia terminal adapter of claim 14, wherein the logic is configured to monitor for pulse dialing activity caused by a faulty telephone and/or telephone line connected to the multimedia terminal adapter by monitoring digit map mismatches and unexpected digit events.

18. The embedded multimedia terminal adapter of claim 17, wherein the logic is configured to monitor digit map mismatches and unexpected digit events by determining if a total number of digit map mismatches and unexpected digit events exceeds a predefined threshold within a predefined monitoring interval.

19. The embedded multimedia terminal adapter of claim 14, wherein the logic is further configured to run a receiver off-hook line-diagnostic test responsive to detecting pulse dialing activity caused by a faulty telephone and/or telephone line connected to the multimedia terminal adapter and to report results of the receiver off-hook line-diagnostic test to the management system via the cable data network.

20. An embedded multimedia terminal adapter, comprising:
a multimedia terminal adapter;
a cable modem communicatively connected to the multimedia terminal adapter, the cable modem configured to provide a connection between the multimedia terminal adapter and a cable data network; and
a telephone line interface communicatively connected to the multimedia terminal adapter, the telephone line interface configured to provide a connection between a telephone line and the multimedia adapter;
wherein the multimedia terminal adapter includes logic configured to monitor for excessive hook state and/or flash events caused by a faulty telephone and/or telephone line connected to the multimedia terminal adapter via the telephone line interface and to report a fault condition to a management system via the cable data network responsive to detecting such excessive hook state and/or flash events.

21. The embedded multimedia terminal adapter of claim 20, wherein the logic is configured to monitor for excessive hook state and/or flash events by determining if a total number of valid loop closed/loop open events exceeds a predefined threshold within a predefined monitoring interval, wherein the valid loop closed/loop open events may include one or more of an off-hook event, on-hook event, pulse dial event, or flash event.

22. The embedded multimedia terminal adapter of claim 20, wherein the logic is further configured to run a receiver off-hook line-diagnostic test responsive to detecting excessive hook state and/or flash events caused by a faulty telephone and/or telephone line connected to the multimedia terminal adapter and to report results of the receiver off-hook line-diagnostic test to the management system via the cable data network.

* * * * *